United States Patent
Hoover (10) Patent No.: US 11,558,498 B1
(45) Date of Patent: Jan. 17, 2023

(54) SEALED DEVICE MOUNTING STRUCTURE WITH POWER AND COMMUNICATION

(71) Applicant: Honda Motor Co., Ltd., Tokyo (JP)

(72) Inventor: Andrew R. Hoover, West Liberty, OH (US)

(73) Assignee: HONDA MOTOR CO., LTD., Tokyo (JP)

(*) Notice: Subject to any disclaimer, the term of this patent is extended or adjusted under 35 U.S.C. 154(b) by 0 days.

(21) Appl. No.: 17/514,793

(22) Filed: Oct. 29, 2021

(51) Int. Cl.
*H04M 1/04* (2006.01)

(52) U.S. Cl.
CPC ..................................... *H04M 1/04* (2013.01)

(58) Field of Classification Search
CPC .......... H04M 1/04; H04M 1/725; H04B 1/04; H04B 1/0485; H60L 53/16; H02J 50/10; H02J 50/12; H02J 50/40
See application file for complete search history.

(56) References Cited

U.S. PATENT DOCUMENTS

| | | | |
|---|---|---|---|
| 6,752,444 B2 | 6/2004 | Kitano et al. | |
| 6,827,384 B2 | 12/2004 | Anderson et al. | |
| 6,921,118 B2 | 7/2005 | Clark et al. | |
| 10,150,425 B1 | 12/2018 | Scalisi | |
| 10,521,179 B2 | 12/2019 | Monroe et al. | |
| 10,744,955 B2 | 8/2020 | Schmid | |
| 2003/0234550 A1 | 12/2003 | Brooks et al. | |
| 2011/0074344 A1 | 3/2011 | Park et al. | |
| 2015/0002088 A1 | 1/2015 | D'Agostino | |
| 2021/0384754 A1* | 12/2021 | Xu | G06F 3/03545 |
| 2021/0398733 A1* | 12/2021 | Moussaoui | H02J 7/02 |
| 2022/0140630 A1* | 5/2022 | Song | H02J 50/40 320/108 |
| 2022/0194236 A1* | 6/2022 | Whiting | B60L 53/16 |

FOREIGN PATENT DOCUMENTS

| | | |
|---|---|---|
| EP | 1852312 | 11/2007 |
| FR | 3085320 | 3/2020 |

\* cited by examiner

*Primary Examiner* — Thanh C Le
(74) *Attorney, Agent, or Firm* — Mark E. Duell; Rankin, Hill & Clark LLP (57) ABSTRACT

A mounting system for an electronic device provides wireless power and wireless communications to the electronic device. The mounting system includes a transmitter coil arranged on a vehicle component, and an adaptor that selectively attaches to the vehicle component and includes a receiver coil. The coils are inductively coupled when they are within a predetermined distance from each other, whereby the receiver coil wireless receives communication signals and electrical power transmitted from the transmitter coil. The electronic device is mounted on the adaptor, and thus mounted on the vehicle component. The electronic device is electrically connected to the receiver coil, and thus receives the electrical power and communication signals from the receiver coil.

20 Claims, 4 Drawing Sheets

SEALED DEVICE MOUNTING STRUCTURE WITH POWER AND COMMUNICATION

BACKGROUND

For personal electronic devices, vehicles include various mechanisms for mounting the devices inside the vehicle, powering the devices while they are inside the vehicle, and providing a communication channel between a vehicle system and the devices while they are inside the vehicle.

These various mounting structures include a stationary connector that allows the electronic device to be mounted at a designated location in the vehicle. A separate power outlet is provided, sometimes near the stationary connector, to which the device is connected so that it receives power from the vehicle. Communication between a vehicle communication system and the device may be established through the power outlet, which may include an integral communication line, or wirelessly through a separate and distinct wireless communication means, such as Bluetooth®.

Autonomous vehicles, including ride sharing vehicles, can allow for passengers to sit anywhere within the vehicle, instead of in designated spots such as in a driver's seat or passenger's seat. Such autonomous vehicles may have non-conventional seating arrangements, and thus may not have customary structures ordinarily dedicated for mounting and powering personal electronic devices. Furthermore, communication between a vehicle system and multiple such devices may not be practical because multiple devices cannot at the same time be paired to, recognized by, or distinguished by the communication system of the vehicle. As such, there is a need for improvements in the mounting of, powering of, and communication with such devices.

BRIEF DESCRIPTION

According to one aspect, a mounting system includes a hollow rail, a transmitter coil arranged inside the rail and configured to wirelessly transmit communication signals and electrical power, and an adaptor configured to be selectively attached to the rail, and including a receiver coil configure to wirelessly receive the communication signals and the electrical power transmitted from the transmitter coil when the adaptor is attached to the rail and the transmitter coil is within a predetermined distance from the receiver coil. If the transmitter coil is not within the predetermined distance from the receiver coil, then the transmitter coil is configured to move with respect to the rail so that the transmitter coil is within the predetermined distance from the receiver coil. The adaptor includes an electrical contact configured to make an electrical connection between the receiver coil and an electronic device to thereby transmit the communication signals and the electrical power to the electronic device.

According to another aspect, a method includes mounting an electronic device to an adaptor; electrically connecting the electronic device to a receiver coil of the adaptor; attaching the adaptor to a hollow rail; if a transmitter coil arranged inside the rail is not within a predetermined distance from the receiver coil, then moving the transmitter coil with respect to the rail so that the transmitter coil is within the predetermined distance from the receiver coil; wirelessly transmitting communication signals and electrical power from the transmitter coil to the receiver coil when the receiver coil is within the predetermined distance from the transmitter coil; and transmitting the communication signals and the electrical power from the receiver coil to the electronic device.

DETAILED DESCRIPTION

Referring now to the figures, a mounting system 2 for an electronic device 4 includes one or more transmitter coils 6, and an adaptor 8 configured to be selectively attach the electronic device 4 to the mounting system 2. The mounting system 2 may be arranged in/on a vehicle 10, but this is not required.

Figure 15:
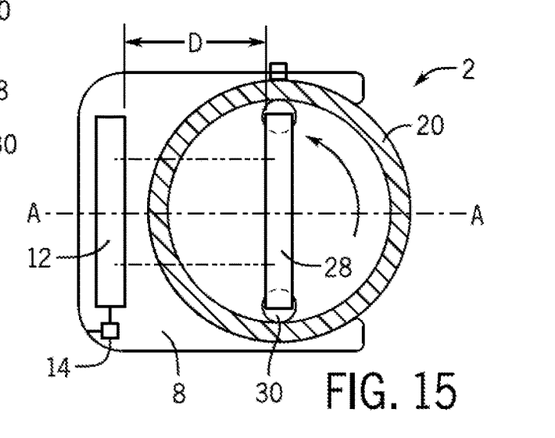
FIG. 15 is a cross-section view of the mounting system of FIG. 13 with aligned coils according to the present subject matter.

The adaptor 8 includes a receiver coil 12. The transmitter coil 6 is configured to wirelessly transmit communication signals and electrical power to the receiver coil 12, which when within a predetermined distance D from the transmitter coil 6 is configured to wirelessly receive the communication signals and the electrical power transmitted from the transmitter coil 6. Wireless transmission of the communication signals and electrical power from the transmitter coil 6 to the receiver coil 12, may be possible through inductive coupling between the two coils 6, 12. That is, the transmitter coil 6 and the receiver coil 12 are configured such that a change in current through the transmitter coil 6 induces a voltage across the ends of the receiver coil 12 through electromagnetic induction. A changing current through the transmitter coil 6 creates a changing magnetic field around it according to Ampere's circuital law. The changing magnetic field induces an electromotive force (EMF or voltage) in the receiver coil 12 according to Faraday's law of induction. The amount of inductive coupling between the transmitter coil 6 and the receiver coil 12 may be measured by their mutual inductance. The inductive coupling between the transmitter coil 6 and the receiver coil 12 may be achieved by positioning the transmitter coil 6 and the receiver coil 12 opposite each other and on a common axis A and such that they are generally parallel to each other (See FIGS. 10 and 15). The coupling between the transmitter coil 6 and the receiver coil 12 may be increased by arranging them to be separated by the predetermined distance D that is equal to or smaller than a diameter of the transmitter coil 6 or a diameter of the receiver coil 12, and where the transmitter coil 6 and the receiver coil 12 are arranged on a common axis A. This may allow the magnetic field of the transmitter coil 6 to pass through the receiver coil 12 by a short-range near-field non-radiative inductive coupling. By this arrangement, electrical power and communication signals can be delivered wirelessly into the adaptor 8 and then to the electronic device 4.

The wireless communication signals may be sent from a vehicle communication system, via the transmitter coil 6, and to the receiver coil 12, which in turn can transmit the communication signals to the electronic device 4 via an electrical contact 14 on the adaptor 8. These in-band communication signals between the transmitter coil 6 and the receiver coil 12 may be used for various purposes, including to identify the electronic device 4 from a plurality of electronic devices, to identify which out-of-band signals to use thereafter between the vehicle communication system and the electronic device 4, etc. These subsequent out-of-band communication signals may include wi-fi, Bluetooth®, near field communications (NFC), etc., each of which may not involve using the transmitter coil 6 and/or the receiver coil, and may instead involve direct wireless communication between the vehicle communication system and the electronic device 4.

The electrical power can be provided from a vehicle power source and delivered to the transmitter coil 6, and then sent wirelessly to the receiver coil 12, which in turn can transmit the electrical power to the electronic device 4 via the electrical contact 14 on the adaptor 8. The electrical power may then power the electronic device, or recharge a battery on the electronic device.

The adaptor 8 includes the electrical contact 14, which is configured to make an electrical connection between the receiver coil 12 and the electronic device 4, and thereby transmit the communication signals and the electrical power to the electronic device 4. The electrical contact 14 may be a universal connection that allows for the connection of different types of electrical devices 4 to the adaptor 8. For example, the electrical contact 14 may be in the form of an outlet (e.g. USB port) or other hardwiring connection that can make the electrical connection and transmit the communication signals and the electrical power to the electronic device 4.

The adaptor 8 may also include a mounting structure 16 for mounting the electronic device 4 to the adaptor 8 and thus to the mounting system 2. The mounting structure 16 is not particularly limited, and may include a mechanical connector (such as a clip, screw, button, strap, clamp, enclosure, hook and loop fasteners, etc.) or a magnetic connector that magnetically secures the electronic device 4 to the adaptor 8.

The transmitter coil 6 is in communication with a power source (e.g. a vehicle power source) and a communication system (e.g. a vehicle communication system), which thereby respectively enable the transmitter coil 6 to transmit the communication signals and the electrical power to the receiver coil 12. The power source may be a power source of a vehicle 10, and the communication system may be a communication system of a vehicle 10, but these are not required and other power sources and communication systems may be utilized.

The adaptor 8 may selectively connect to a vehicle component, such as a center console 18 (FIGS. 1-3), a rail 20 (FIGS. 1 and 4-15), or a dash board, a door, a ceiling, a floor, or other vehicle component. By this connection, the adaptor 8 is mounted to the vehicle component, and thereby mounts the electrical device 4 to the vehicle component. The transmitter coil 6 may be configured as a part the vehicle component.

Figure 1:
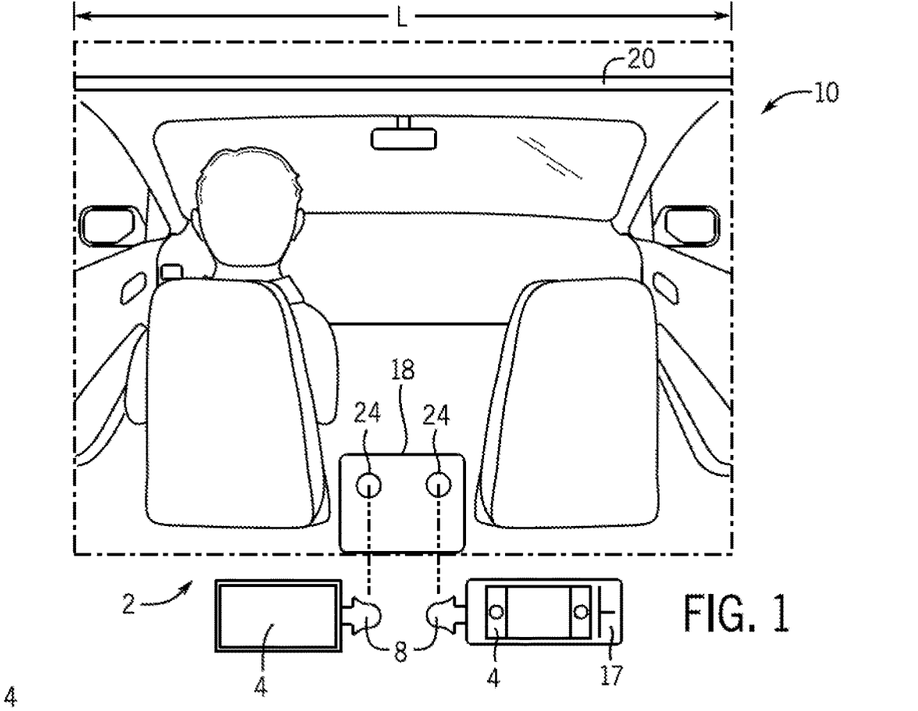
FIG. 1 is a rear view of a vehicle interior including a mounting system according to the present subject matter.
Figure 2:
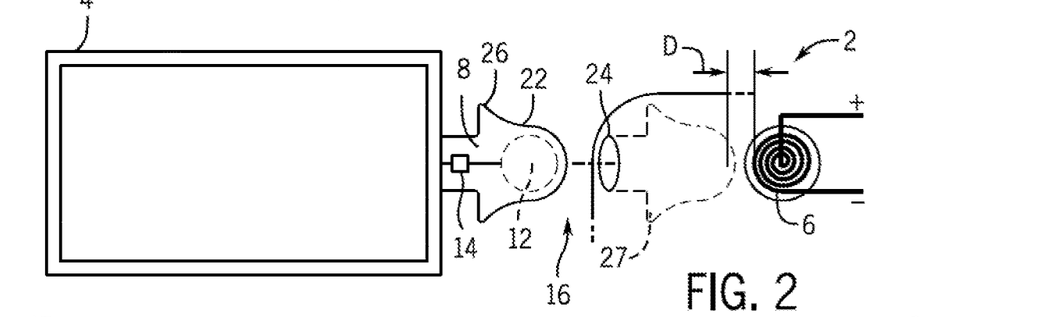
FIG. 2 is a perspective view of a mounting system according to the present subject matter.
Figure 3:
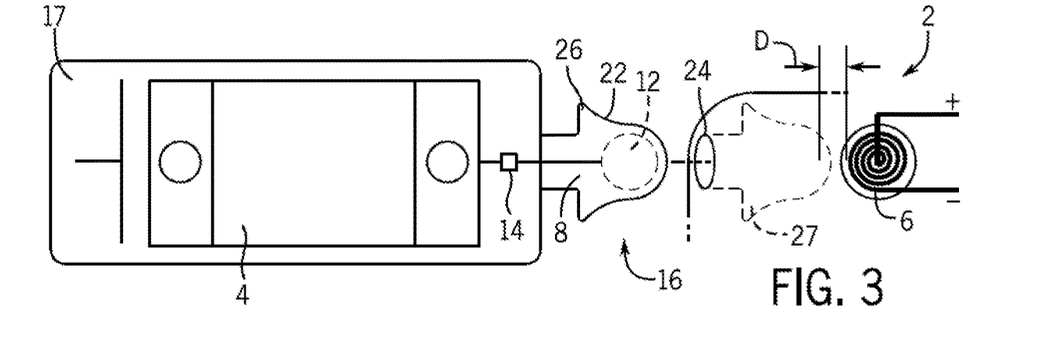
FIG. 3 is a perspective view of another mounting system according to the present subject matter.
Figures 4, 5, 6, 7, 8:
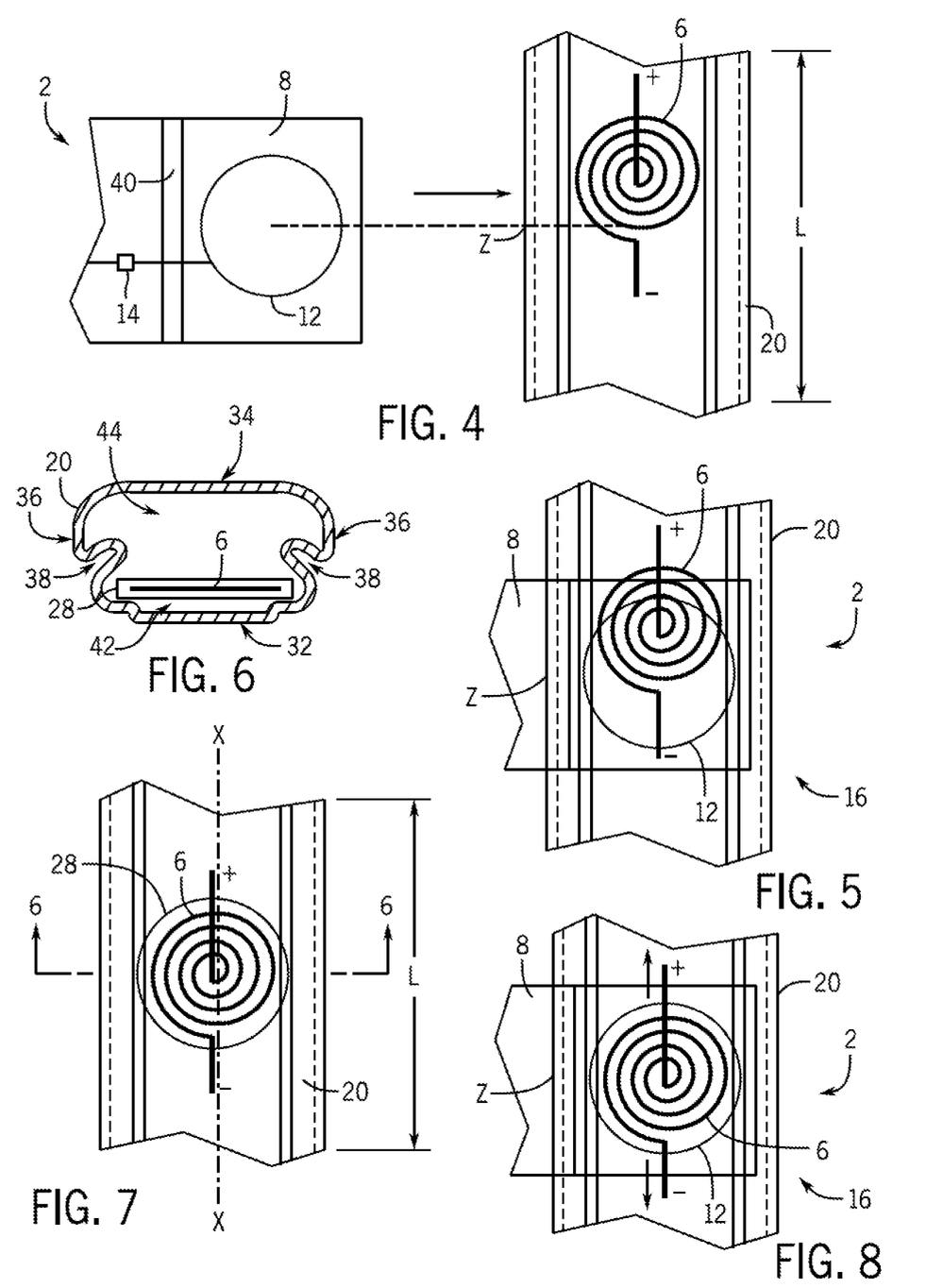
FIG. 4 is a top cut away view of another mounting system in a disconnected state according to the present subject matter.
FIG. 5 is a top cut away view of the mounting system of FIG. 4 in a connected state and with misaligned coils according to the present subject matter.
FIG. 6 is a sectional view of a rail of a mounting system as taken along lines 6-6 from FIG. 7 according to the present subject matter.
FIG. 7 is a top cut away view of a rail of a mounting system according to the present subject matter.
FIG. 8 is a top cut away view of the mounting system of FIG. 5 with aligned coils according to the present subject matter.
Figure 9:
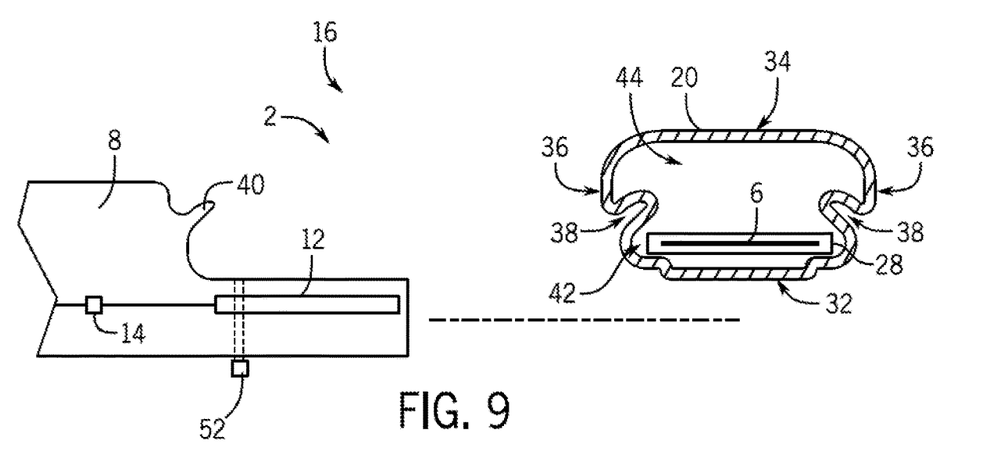
FIG. 9 is a cross-section view of a mounting system in a disconnected state according to the present subject matter.

As shown in FIGS. 1-3, the transmitter coil 6 may be arranged in a middle console 18 (FIGS. 1-3) of the vehicle 10. However, this is not required, and the transmitter coil 6 can also be arranged in other components of the vehicle 10 such as a dashboard, arm rest, door, floor, ceiling, etc. The mounting structure 16 includes a projection 22 and an opening 24. FIG. 2 shows an electronic device 4 mounted to the projection 22. FIG. 3 shows an electronic device 4 mounted to a backing 17 having the projections 22 projecting therefrom. The projection 22 fits into and mates with the opening 24, which may be arranged in the center console 18 of the vehicle 10 or elsewhere. The transmitter coil 6 is arranged adjacent to the opening 24. The transmitter coil 6 is separate from the opening 24, and thus is isolated from the opening 24, which is part of the mounting structure 16. Accordingly, even if the mounting system 16 is damaged or not operating perfectly, the transmitter coil 6 may still be operated independent from the mounting system 16.

The projection 22 may include a flange 26 that mates with a recess 27 of the opening 24 to releasably secure the projection 22, and thus the adaptor 8, in the opening 24. The projection 22 includes the receiver coil 12, which when the projection 22 is fully inserted into the opening 24 and secured in the opening 24, is within the predetermined distance D from the transmitter coil 6. In a non-limiting embodiment, the receiver coil 12 is within the predetermined distance D from the transmitter coil 6 only when the projection 22 is fully inserted into the opening 24 and secured in the opening 24. In this way, the transmitter coil 6 can transmit the communication signals and the electrical power to the receiver coil 12 only when the projection 22 is fully inserted into the opening 24 and secured in the opening 24.

As shown in FIGS. 1-15, the mounting structure may include a hollow rail or tube 20 and the adaptor 8, which mounts on the rail 20. One or more transmitter coils 6 may be arranged inside the rail 20. The rail 20 may be totally sealed from an exterior environment, thus isolating the transmitter coil 6 from exposure to environmental contaminants and degradation.

The rail 20 may be mounted in the vehicle 10, such as along a ceiling 26 (FIG. 1) in the passenger's compartment, and/or along a door, floor, or other portion of the vehicle 10. In vehicles with panoramic roofs made from transparent or transparent materials, traditional roof mounting structures are not used. In these vehicles, the rail 20 may be mounted to a side portion of the vehicle, and thus not directly to the panoramic roof, and thus would not physically compromise the material used to make the panoramic roof.

One or more adaptors 8, each including the receiver coil 12, may be attached to the rail 20 anywhere along a length L of the rail 20. One or more transmitter coils 6 may be arranged inside the rail 20, and thus able to power the one or more receiver coils 12 in the one or more adaptors 8. although multiple transmitter coils 6 can be included inside the rail 20 and multiple adaptors 8 can be connected to the rail 20, the invention however, will be described with respect to one transmitter coil 6 arranged inside the rail 20, and one adaptor 8 being attached to the rail 20.

The transmitter coil 6 may be movably arranged inside the rail 20. This allows the transmitter coil 6 to be within the predetermined distance D from the receiver coil 12 no matter where the adapter 8 is connected along the length L of the rail 20. In other words, if adaptor 8 is attached to the rail 20, and the transmitter coil 6 is not within the predetermined distance D from the receiver coil 12, then the transmitter coil 6 may move with respect to the rail 20 as a function of an attachment location of the adapter 8 on the rail 20. Such movement of the transmitter coil 6 with respect to the rail 20 allows the transmitter coil 6 to be within the predetermined distance D of the receiver coil 12. For this purpose, the transmitter coil 6 may be able to move longitudinally along the length L of the rail 20 (FIGS. 4-15), able to move rotationally inside the rail 20 at a given location along the length L (FIGS. 12-15), able to move laterally along a width of the rail 20, or a combination thereof.

The transmitter coil 6 may be movably arranged inside the rail 20 by being loosely arranged in the rail 20 (FIGS. 4-11), movably attached to a track inside the rail 20, attached to a guide member 28 that is moveable with respect to the rail 20 (FIGS. 6, 7, 9, 10-15), attached to roller bearings 30 or other friction reducing member so as to be "floating" inside rail 20 (FIGS. 12-15), or otherwise not immovably connected to the rail 20. In a non-limiting embodiment, the transmitter coil 6 can move only along the length L of the rail 20 (FIGS. 4-11). In a non-limiting embodiment, the transmitter coil 6 can move along the length L of the rail 20, as well as rotationally inside the rail 20 at a given location along the length L (FIGS. 12-15).

In FIGS. 4, 5, 8, 11, the transmitter coil 6 is loosely arranged in the rail 20, and thus may move along the length L of the rail 20. In FIGS. 6, 7, 9, 10, the transmitter coil 6 is arranged on a guide member 28 and thus may move along the length L of the rail 20. In FIGS. 12-15, the transmitter coil 6 is arranged in a guide member 28, which is attached to roller bearings 30 that allow both longitudinal movement of the transmitter coil 6 along the length L of the rail 20 as indicated by arrows in FIG. 14, as well as rotational movement inside the rail 20 as indicated by the arrow in FIG. 15.

Figure 10:
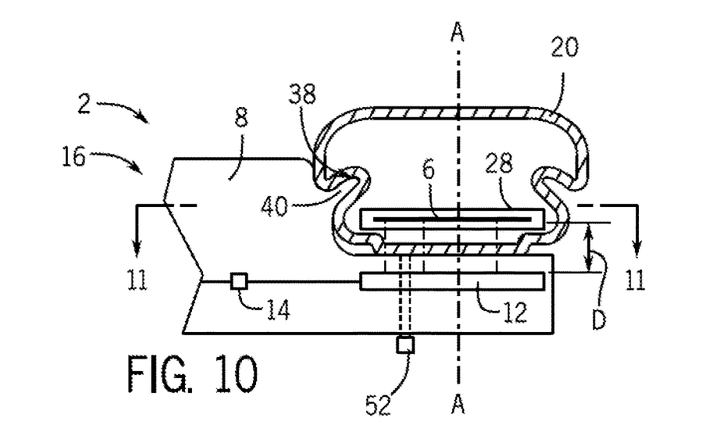
FIG. 10 is a cross-section view of the mounting system of FIG. 9 in a connected state according to the present subject matter.
Figure 11:
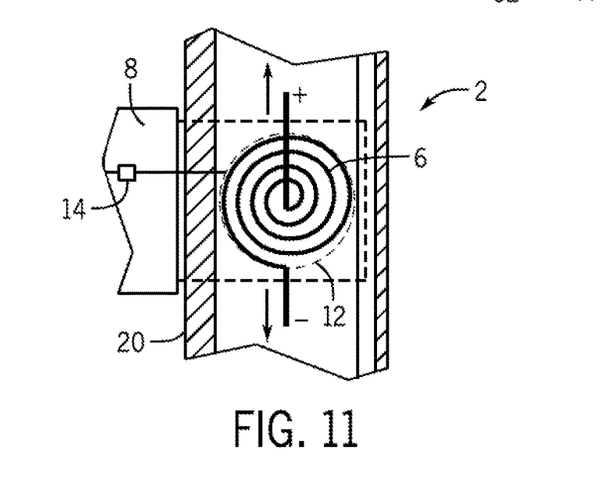
FIG. 11 is a cross-section view of the mounting system of FIG. 10 taken along line 11-11.
Figure 12:
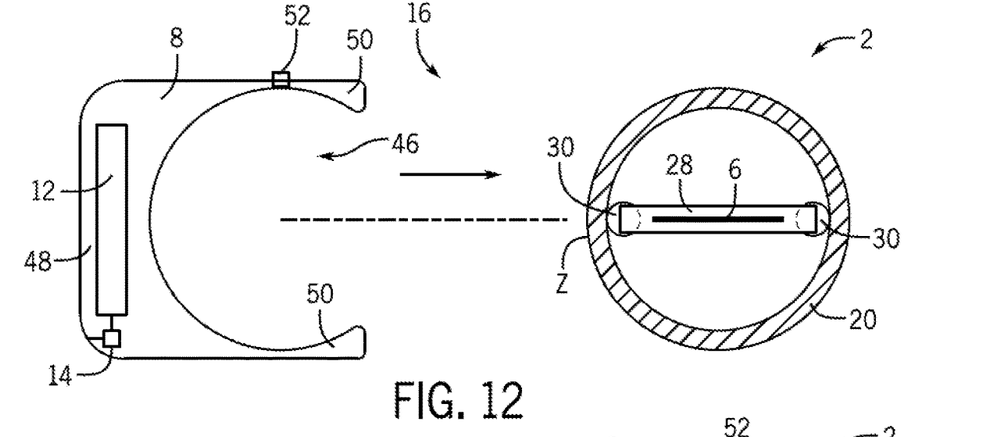
FIG. 12 is a cross-section view of another mounting system in a disconnected state according to the present subject matter.

The rail 20 and adaptor 8 may be configured such that the adaptor 8 can be attached to the rail 20 at any location (i.e. a plurality of locations) along the length L of the rail 20, but in a way that the receiver coil 12 is in only one orientation with respect to the rail 20. With reference to FIGS. 4-11, the rail 20 and adaptor 8 may have corresponding mating surfaces that allow this only one orientation of the receiver coil 12 with respect to the rail 20 when the adaptor 8 is connected to the rail 20. The rail 20 may have a bottom 32, top 34, and two sides 36 connecting the bottom 32 and top 34. The sides 36 may each include an external indented groove 38 running the length L of the rail 20, and into which a corresponding projection 40 on the adaptor 8 is inserted when the adaptor 8 is attached to the rail 20 (FIG. 10). Attachment of the adaptor 8 to the rail 20 results in mating between the projection 40 and the groove 38, which thus determines the orientation of the receiver coil 12 to the rail 20, which orientation is predefined according to the shape of the mating surfaces. As shown in FIG. 10, the receiver coil 12 is generally parallel to the bottom 32 of the rail 20 when the adaptor 8 is attached to the rail 20, however, this is not required and other orientations of the receiver coil 12 with respect to the rail 20 can be used. In addition, the two grooves 38 in the two sides 36 of the rail 20 project inward inside the rail 20 and thus form a bottom passage 42 and a top passage 44 inside the rail 20. The transmitter coil 6 and the guide member 28 if included, are arranged in the bottom passage 42 and are confined therein by the two grooves 38 projecting inward. Because there is a groove 38 on either side 36 of the rail 20, the adaptor 8 can be mounted on either side 36 of the rail 20, and thus the electronic device 4 mounted to the adaptor 8 can be arranged on either side 36 of the rail 20, such as on a front side 36 or a back side 36 of the rail 20. This allows the rail 20 to be installed inside different types of vehicles, including those with seats that face each other. A centrally located rail 20 would allow passengers in both seats to utilize the rail 20 to attach their electronic device 4 via an adaptor 8.

Because of their size, and/or shape, and their arrangement in the bottom passage 42, the transmitter coil 6 and guide member 28 also have only one orientation with respect to the rail 20 although they can still move along the length L of the rail 20. That is, the transmitter coil 6 is also oriented generally parallel to the bottom 32 of the rail 20, and thus is also oriented generally parallel to the receiver coil 12. This generally parallel orientation of the two coils 6, 12 (FIG. 10) may be necessary to allow them to be within the predetermined distance D of each other. In other words, if one or both of the coils 6, 12 had a different orientation that was not generally parallel to the bottom 32 of the rail 20, and thus not generally parallel to each other, then the two coils 6, 12 may not be within the predetermined distance D of each other.

However, because of the mating surfaces between the rail 20 and the adaptor 8, where the projection 40 engages one of the grooves 38 when the adaptor 8 is attached to the rail 20, this puts the two coils 6, 12 in a generally parallel orientation to each other, and thus within the predetermined distance D of each other. This allows the transmitter coil 6 to transmit the communication signals and electrical power to the receiver coil 12, and the receiver coil 12 to receive the communication signals and electrical power from the transmitter coil 6.

The rail 20 and adaptor 8 may be configured such that the adaptor 8 can be attached to the rail 20 at any location along the length L of the rail 20, and in a way that the receiver coil 12 can be in any orientation with respect to the rail 20. With reference to FIGS. 12-15, the rail 20 and adaptor 8 may have corresponding mating surfaces that allow for any orientation of the receiver coil 12 with respect to the rail 20. The rail 20 may have a generally circular shape in cross section, and the adaptor 8 may be a hollow body that includes a hollow area 46 that has a corresponding circular shape in cross section defined by a base 48 and two arms 50. The two arms 50 and base 48 may fit around the rail 20 and secure the adaptor 8 to the rail 20. Mating between the hollow 46 and the rail 20 (FIG. 13) is thus accomplished in any of a plurality or circumferential orientation around the circumference of the rail 20, and thus the mating surfaces of the adaptor 8 and rail 20 do not determine the circumferential orientation of the receiver coil 12 with respect to the rail 20, but instead allows for any circumferential orientation of the receiver coil 12 with respect to the rail 20.

Figure 13:
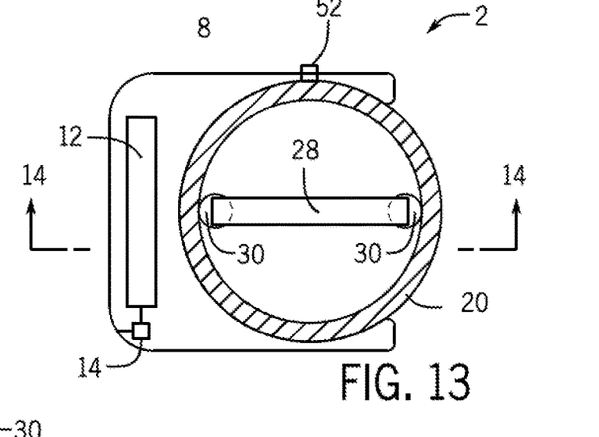
FIG. 13 is a cross-section view of the mounting system of FIG. 12 in a connected state but with misaligned coils according to the present subject matter.
Figure 14:
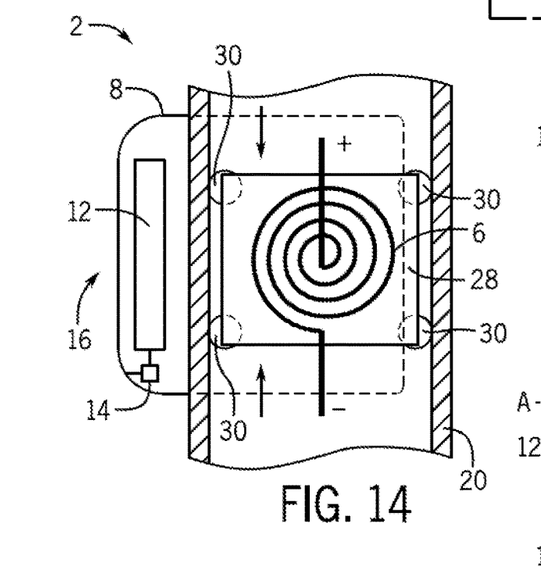
FIG. 14 is a cross-section view of the mounting system of FIG. 13 taken along line 14-14.

As shown in FIG. 13, the receiver coil 12 is generally parallel to the base 48 of the adaptor 8, but is not in a predefined orientation with respect to the rail 20 since the rail 20 is round and the adaptor 8 can be attached thereto in any circumferential orientation. To accommodate for this, the transmitter coil 6 and optional guide member 28 are mounted inside the rail 20 on roller bearings 30. These roller bearings 30 allow the transmitter coil 6 and optional guide member 28 to "float" inside the rail 28 by allowing the transmitter coil 6 to move longitudinally along the length L of the rail 20 (see arrows in FIG. 14), and to move rotationally inside the rail 20 (see arrow in FIG. 15) by rotating about a longitudinal axis X of the rail 20. Thus, when the adaptor is connected to the rail 20 and the two coils 6, 12 are not generally parallel to each other, the transmitter coil 6 and optional guide member 28 move rotationally inside the rail 20 about the longitudinal axis X as shown between FIGS. 13 and 15 so that the transmitter coil 6 is generally parallel to the receiver coil 12. This generally parallel orientation of the two coils 6, 12 (FIG. 15) may be necessary to allow them to be within the predetermined distance D of each other. In other words, if one or both of the coils 6, 12 had a different orientation that was not generally parallel to each other, then the two coils 6, 12 may not be within the predetermined distance D of each other, which allows the transmitter coil 6 to transmit the communication signals and electrical power to the receiver coil 12, and the receiver coil 12 to receive the communication signals and electrical power from the transmitter coil 6.

Movement of the transmitter coil 6 with respect to the rail 20—so that it is within the predetermined distance D from the receiver coil 12 and thus able to wirelessly transmit the communication signals and electrical power to the receiver coil 12—may be executed actively using a mechanical force, executed passively using a magnetic force, or a combination thereof.

A mechanical force used to move the transmitter coil 6 with respect to the rail may include a motor, which may be arranged at a longitudinal end of the rail 20 and connected to the transmitter coil 6 by a cable, ribbon, chain, or otherwise, or may be arranged on the guide member 28 itself. Other arrangements and configurations may be used as the mechanical force for moving the transmitter coil 6 with respect to the rail 20. A sensor or other mechanism may be used to "find" the receiver coil 12 by determining if, and the location at which, the adaptor 8 and receiver coil 12 are connected along the length L of the rail 20. This connection and location information of the receiver coil 12 with respect to the rail 20 may then be used as a basis for moving the transmitter coil 6 along the length L of the rail 20 to the "found" location so that the transmitter coil 6 is within the predetermined distance D from the receiver coil 12, which allows the transmitter coil 6 to wirelessly transmit the communication signals and electrical power to the receiver coil 12 and thus ultimately to the electronic device 4 through the electrical contact 14. A measure of the power loss between that which is transmitted from the transmitter coil 6 versus that which is received by the receiver coil 12 may be used by the mounting system to "find" the receiver coil 12, which may be done by moving the transmitter coil 6 along the length L of the rail 20 and determining at which location the power loss is the least, which is ultimately the location where the transmitter coil 6 is within the predetermined distance D from the receiver coil 12.

A magnetic force used to move the transmitter coil 6 with respect to the rail 20 may result from a magnetic attraction between the transmitter coil 6 or its associated components (e.g. the guide member 28 or roller bearings 30), and the receiver coil 12 and its associated components (e.g. the adaptor 8). Such a magnetic attraction may result from a magnetic field generated by a permanent magnet, an electromagnet, or combinations thereof, which magnetic field may attract ferrous metal components of the transmitter coil 6 or its associated components, and/or of the receiver coil 12 or its associated components.

A permanent magnet may be arranged adjacent to the transmitter coil 6 (such as on the guide member 28) or adjacent to the receiver coil 12 (such as on the adaptor 8). An electromagnet may be arranged adjacent to the transmitter coil 6, or may be the transmitter coil 6 itself when having an electric current being run through it. The magnetic force may result in the transmitter coil 6 moving with respect to the rail 20 so as to be within the predetermined distance D from the receiver coil 12.

When first attached to the rail 20 at an initial location on the rail 20, the receiver coil 12 and its associated components may need to be moved along the length L of the rail 20 so that the transmitter coil 6 and its associated component, and the receiver coil 12 and its associated components are close enough to allow the magnetic force to move the transmitter coil 6 so that it is within the predetermined distance D of the receiver coil 12. Such initial movement of the receiver coil 12 along the length L of the rail 20 allows the receiver coil 12 to "find" the transmitter coil 6 and magnetically "connect" with the transmitter coil 6, and thus allows the transmitter coil 6 to follow the receiver coil 12 along the length L of the rail 20 if the receiver coil 12 is moved to a different and final desired location along the length L of the rail 20.

With respect to movement of the transmitter coil 6 along the length L of the rail 20, the adaptor 8 can be selectively attached to the rail 20 at a location Z along the length L of the rail 20, which location Z can be any one of a plurality of locations along the length L of the rail 20. The adaptor 8 may be locked to the rail 20 at a desired location Z (FIGS. 4-15) and optionally also in a desired orientation with respect to the rail 20 (FIGS. 12-15) using a lock 52 such as a set screw, clamp, or other mechanism that may be operated by hand and arranged on the adaptor 8. With respect to FIGS. 12-15, the set screw may also be used to lock the adaptor 8 in any one of a plurality of circumferential orientations with respect to the circumference of the rail 20.

If the coils 6, 12 are not longitudinally aligned with each other along the length L of the rail 20 at location Z (i.e. are not on a common axis A), and thus not within the predetermined distance D from each other (FIG. 5), then the transmitter coil 6 can be moved longitudinally (e.g. down in FIG. 5) by the mechanical or magnetic force along the length L of the rail 20 so that it is longitudinally aligned with (i.e. on a common axis A with) the receiver coil 12 (FIG. 8) at location Z, and thus within the predetermined distance D from the receiver coil 12. As shown in FIGS. 4-11, the transmitter coil 6 or the guide member 28 may be arranged inside the rail 20 such that movement of the transmitter coil 6 inside the rail 20 is restricted to longitudinal movement only along the length L of the rail 20, and thus the transmitter coil 6 cannot move rotationally within the rail 20, or laterally along a width of the rail 20. The same movement of the transmitter coil 6 along the length L of the rail 20 can also be accomplished where the transmitter coil 6 is mounted inside the rail 20 by roller bearings 30, which allow both longitudinal movement of the transmitter coil 6 along the length L of the rail 20, as well as rotational movement of the transmitter coil 6 inside the rail 20.

The present subject matter includes a method of mounting, powering, and communicating with an electronic device 4. The method includes mounting the electronic device 4 to the adaptor 8. The electronic device 4 may be electrically connected to the receiver coil 12 via the electrical contact 14. For this, the electronic device 4 may be plugged into the electrical contact 14 directly, or by using an electrical cord. The adaptor 8 is attached to the hollow rail 20 at a location A along the length L of the rail 20. If the transmitter coil 6 arranged inside the rail 20 is not within the predetermined distance D from the receiver coil 12, then the transmitter coil 6 is moved with respect to the rail 20 so that the transmitter coil 6 is within the predetermined distance D from the receiver coil 12. The method includes wirelessly transmitting communication signals and electrical power from the transmitter coil 6 to the receiver coil 12 when the receiver coil 12 is within the predetermined distance D from the transmitter coil 6, and transmitting the communication signals and the electrical power from the receiver coil 12 to the electronic device 4, It will be appreciated that various of the above-disclosed and other features and functions, or alternatives or varieties thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A mounting system including:
a hollow rail,
a transmitter coil arranged inside the rail and configured to wirelessly transmit communication signals and electrical power, and
an adaptor configured to be selectively attached to the rail, and including a receiver coil configure to wirelessly receive the communication signals and the electrical power transmitted from the transmitter coil when the adaptor is attached to the rail and the transmitter coil is within a predetermined distance from the receiver coil;
wherein if the transmitter coil is not within the predetermined distance from the receiver coil, then the transmitter coil is configured to move with respect to the rail so that the transmitter coil is within the predetermined distance from the receiver coil; and
wherein the adaptor includes an electrical contact configured to make an electrical connection between the receiver coil and an electronic device to thereby transmit the communication signals and the electrical power to the electronic device.

2. The mounting system according to claim 1, wherein the adaptor includes a mounting structure for mounting the electronic device to the adaptor and thereby mounting the electronic device to the rail.

3. The mounting system according to claim 1, wherein the transmitter coil is moved by a magnetic force to thereby be within the predetermined distance from the receiver coil.

4. The mounting system according to claim 1, wherein the transmitter coil is moved by a mechanical force to thereby be within the predetermined distance from the receiver coil.

5. The mounting system according to claim 1, wherein the adaptor is configured to be selectively attached to the rail at a plurality of locations along a length of the rail.

6. The mounting system according to claim 5, wherein the transmitter coil can move only along the length of the rail.

7. The mounting system according to claim 6, wherein:
the rail includes at least one groove extending along the length of the rail;
the adaptor includes a projection; and
the at least one groove and the projection are mated together to thereby selectively attach the adaptor to the rail at one of the plurality of locations along the length of the rail and in a predefined orientation with respect to the rail.

8. The mounting system according to claim 5, wherein:
the adaptor includes a hollow body that surrounds a circumference of the rail;
the adaptor can assume a plurality of circumferential orientations with respect to the circumference of the rail; and
the adaptor can be selectively attached to the rail by being locked to the rail in one of the plurality of locations along the length of the rail and in one of the plurality of circumferential orientations with respect to the circumference of the rail.

9. The mounting system according to claim 8, wherein the transmitter coil can move only a) along the length of the rail, and b) inside the rail by rotating about a longitudinal axis of the rail whereby the transmitter coil can be parallel to the receiver coil.

10. The mounting system according to claim 9, wherein the transmitter coil is mounted inside the rail by ball bearings.

11. The mounting system according to claim 1, wherein:
the rail is mounted in a vehicle;
the transmitter coil is in communication with a vehicle power source that enables the transmitter coil to transmit the electrical power; and
the transmitter coil is in communication with a vehicle communication system that enable the transmitter coil to transmit the communication signals.

12. A method comprising:
mounting an electronic device to an adaptor;
electrically connecting the electronic device to a receiver coil of the adaptor;
attaching the adaptor to a hollow rail;
if a transmitter coil arranged inside the rail is not within a predetermined distance from the receiver coil, then moving the transmitter coil with respect to the rail so that the transmitter coil is within the predetermined distance from the receiver coil;
wirelessly transmitting communication signals and electrical power from the transmitter coil to the receiver coil when the receiver coil is within the predetermined distance from the transmitter coil; and
transmitting the communication signals and the electrical power from the receiver coil to the electronic device.

13. The method according to claim 12, wherein the transmitter coil is moved by a magnetic force to be within the predetermined distance from the receiver coil.

14. The method according to claim 12, wherein the transmitter coil is moved by a mechanical force to be within the predetermined distance from the receiver coil.

15. The method according to claim 12, where the adaptor can be attached to the rail at a plurality of locations along a length of the rail.

16. The method according to claim 15, wherein the transmitter coil can move only along the length of the rail.

17. The method according to claim 16, wherein:
the rail includes at least one groove extending along the length of the rail;
the adaptor includes a projection; and
the projection and the at least one groove are mated together to thereby attach the adaptor to the rail at one of the plurality of locations along the length of the rail, and in a predefined orientation with respect to the rail whereby the receiver coil is arranged parallel to the transmitter coil.

18. The method according to claim 15, wherein:

the adaptor includes a hollow body that surrounds a circumference of the rail; and the adaptor is locked to the rail at one of the plurality of locations along the length of the rail and in one of a plurality of circumferential orientations with respect to the circumference of the rail.

19. The method according to claim 18, wherein the transmitter coil can move only a) along the length of the rail, and b) inside the rail by rotating about a longitudinal axis of the rail whereby the transmitter coil is parallel to the receiver coil.

20. The method according to claim 19, wherein the transmitter coil is mounted inside the rail by ball bearings.

* * * * *